April 18, 1967 HISASHI KANEKO 3,315,251

ENCODING DEVICE WITH NON-LINEAR QUANTIZATION

Filed Oct. 8, 1963 2 Sheets-Sheet 1

Inventor
HISASHI KANEKO
By [signature]
Attorney

Inventor
HISASHI KANEKO
By [signature]
Attorney

United States Patent Office 3,315,251

Patented Apr. 18, 1967

3,315,251

ENCODING DEVICE WITH NON-LINEAR QUANTIZATION

Hisashi Kaneko, Tokyo, Japan, assignor to Nippon Electric Company, Limited, Tokyo, Japan, a corporation of Japan

Filed Oct. 8, 1963, Ser. No. 314,764
Claims priority, application Japan, Oct. 23, 1962, 37/47,330
3 Claims. (Cl. 340—347)

Figure 1:
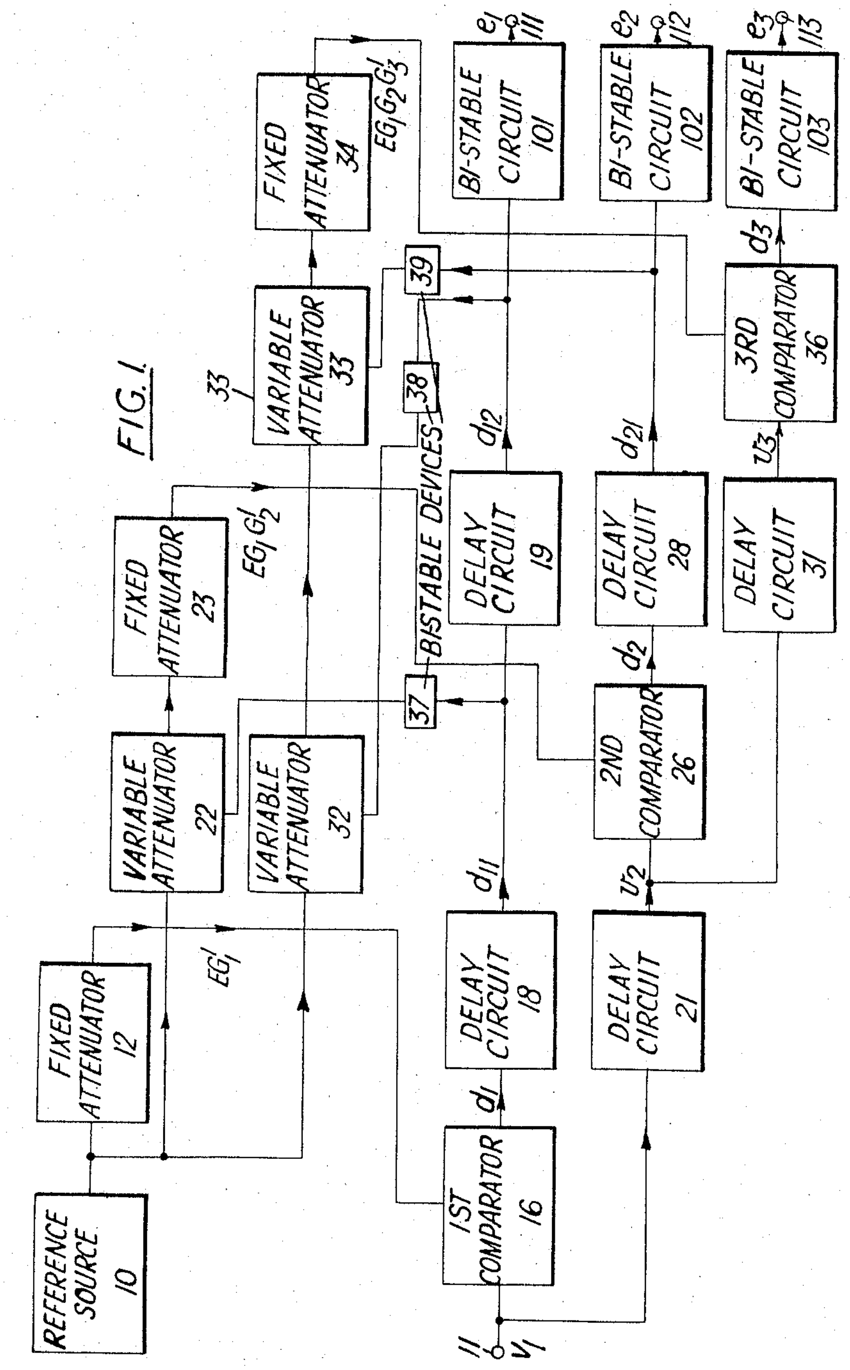

This invention relates to an encoding device of the parallel feed forward type for use as an encoder for pulse-code modulation (PCM), an analogus-digital converter, or a digital voltmeter with decibel readings, and more particularly to an encoding device of the type for non-linearly quantizing a continuous or analogue signal and converting the same into a digital signal without use of the inherent non-linearity of non-linear circuit elements.

Conversion into digital signals by sampling, quantizing, and encoding analogue signals representing analogue quantities such as voice, picture, data, or others, provides technical advantages such as decrease in susceptibility of the information to noise during transmission and processing. Although analogue signals or sampled analogue signals are generally quantized with equal quantization steps, some types of analogue signals such as voice signals in which there is a probability of signals of smaller amplitude occurring frequency, are preferably quantized with minor quantization steps for signals of smaller amplitudes as compared with quantization steps for signals of larger amplitudes. For such non-linear quantization, analogue signals have been either compressed or expanded by an instantaneous compandor, in which the inherent non-linearity of non-linear circuit elements such as semiconductor devices or vacuum tubes are utilized, and then quantized linearly. With such non-linear quantization whose characeristic depends on the inherent non-linearity of non-linear circuit elements, it has been impossible to obtain uniform non-linear quantization characteristics because of the temperature dependency and variations of the inherent non-linearities.

Non-linear companding of logarithmic companding characteristic is very often preferred in for various reasons, such as that the signal-to-noise ratio is independent of the input signal levels and that human sense is in logarithmic relation to the stimulus as is known as the Weber-Fechner's law. The logarithmic companding characteristic may be obtained with $2(n-1)$ networks, where $n$ is the code length, by varying in the pulse-circulating type comparison encoder disclosed in my copending patent application Ser. No. 130,897 filed Aug. 11, 1962, circulation loop by means of a switching means at every digits. It is, however, doubtful whether or not it is possible to realize an encoder having high precision and speed with the pulse-circulating type wherein an analogue signal is repeatedly circulated in the form of successive pulses through a delay line disposed in the circulation loop.

Meanwhile, an encoder of the parallel feed forward type whereby the results of encoding are simultaneously obtainable at every time interval of the sampling, is preferable as a high speed encoder. It has, however, been impossible to provide a parallel feed forward encoder which has by itself a non-linear quantization characteristic.

An object of the invention is therefore to provide a parallel feed forward encoder with a non-linear characteristic, wherein use is not made of the inherent non-linearity of non-linear circuit elements, such as semiconductor devices, but use is made of only as small number of circuit elements as possible. Preferably the encoder is of the kind having a logarithmic companding characteristic.

Still another object of the invention is to provide an encoder of the kind with a logarithmic companding characteristic, wherein change with time of the sampled voltage stored in the sampled voltage holding circuit does not cause any error in the results of encoding.

This invention provides a parallel feed forward encoder with a non-linear characteristic, by combining a conventional parallel feed forward encoder with a plurality of amplitude changers (attenuators of amplifiers) providing amplitude ratios which are interswitchable among a predetermined number of values and multiplied by one another to give amplitude changers whose magnitudes are determined by the desired non-linear function. For convenience of description the amplitude changers are referred to hereinafter as attenuators. It will be understood however, that amplifiers may be used instead.

Now the principles of the invention will be explained.

If the code length of a codeword of a digital signal or the number or digits in a codeword is $n$ and if $i$ represents a number between 0 and $N(=2^n)$ inclusive, then the number $i$ which represents the ordinal of a quantization level may be given by an $n$-bit binary codeword ($e_1$, $e_2$, . . . , $e_n$) in such a manner that $$N-i=e_1\times 2^{n-1}+e_2\times 2^{n-2}+ \ . \ . \ . \ +e_{n-1}\times 2+e_n \quad (1)$$

where $e_k (k=1\ 2, \ . \ . \ . \ , n)$ is a binary code of the $k$th digit and is either 0 or 1. By introducing a function $$y=E.r_1^{N-i} \quad (2)$$

of $i$ and by considering another function $$x=y-d \quad (3\text{–}1)$$

where $$d=E.r_1^N \quad (3\text{–}2)$$

and furthermore by using $$r_1=(1+u)^{-1/N} \quad (3\text{–}3)$$

and $$E_0=E.(1-r_1^N)=E.u/(1+u) \quad (3\text{–}4)$$

we can get $$i/N=\log\ (1+ux/E_0)/\log\ (1+u) \quad (4)$$

which shows if $x$ introduced by the Equation 3–1 is an individual voltage taken out of a given analogue signal and if $E_0$ introduced by the Equation 3–4 is a voltage not smaller than the anticipated maximum voltage of the analogue signal, the logarithmic companding characteristic or the "mu" characteristic discussed by Bernard Smith in "Bell System Technical Journal," 1957 May issue, pp. 653–709 is provided. Incidetnally, $y$ and E introduced by the Equation 1 are a preliminary quantized voltage for delivery from the individual voltage $x$ taken out of the given analogue signal the logarithmically companded quantized level $i$ corresponding to such individual voltage $x$ and a reference voltage for delivering such preliminary quantized voltage $y$, respectively; $d$ introduced by the Equation 3–1 gives a minute correction voltage to be reduced from the preliminary quantized voltage $y$ to provide the desired quantized voltage $x$; $r_1$ introduced by the Equation 3–2 gives the first one of attenuation ratios for deriving the preliminary quantized voltage $y$ from the reference voltage E; and $u$ introduced by the Equation 3–3 is a constant for determining the degree of companding and what is usually written by a Greek letter "mu" and set at from 100 to 200. By substituting the Equation 1 into the Equation 2 we obtain $$y=E.r_1^{(e_1\times 2^{n-1}+e_2\times 2^{n-2}+\ .\ .\ .\ +e_n)}$$

which may be rewritten into $$y=E.G_1.G_2.\ .\ .\ .\ .G_n \quad (5)$$

where $$G_k = r_{n-k+1}e_k = \begin{cases} r_{n-k+1} = r_1^{2^{n-k}} \\ \quad = (1+u)^{-1/2^k} (\text{when } e_k = 1) \\ r_{n-k+1}0 = 1, \ (\text{when } e_k = 0), \end{cases} \quad (6)$$

in which connection, another equation $$G_k' = r_{n-k+1} = r_1^{2n-k} = (1+u)^{-1/2k} \quad (7)$$

be defined. Inasmuch as $k$ stands for the number of the digit, the $k$th digit binary digit code $e_k$ selected so that a comparison voltage $E.G_1, G_2. \ldots .G_n$ obtained by causing stepwise attenuation to the reference voltage E in the manner indicated by the Equation 5 by means of cascaded $n$ attenuators which each has an attenuation ratio $G_k$ interswitchable between $G_k'$ given by the Equation 7 and 1 or namely interswitchable attenuation ratios defined by the Equation 6 according to such binary code $e_k$, may be equal to the preliminary quantized voltage $y$ which is the sum of the individual voltage $x$ taken out of the given analogue signal plus the minute correction voltage $d$, will give the desired codeword $\}e_1, e_2, \ldots, e_n\{$ which is a digital signal resulting by logarithmically companding and encoding the given analogue signal.

The above mentioned and other features and objects of this invention and the manner of attaining them will become more apparent and the invention itself will best be understood by reference to the following description of an embodiment of the invention taken in conjunction with the accompanying drawings wherein:

FIG. 1 is a block circuit diagram of an embodiment of the invention, and

Figure 2:
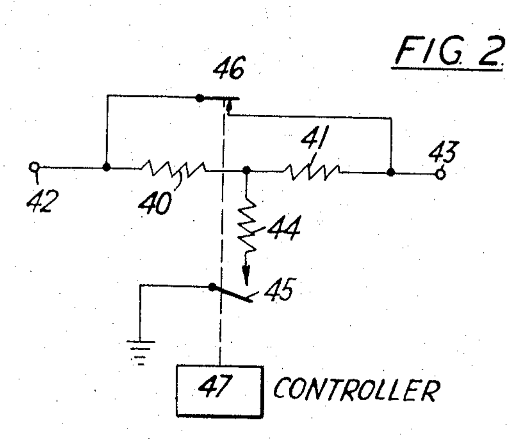
Figure 3:
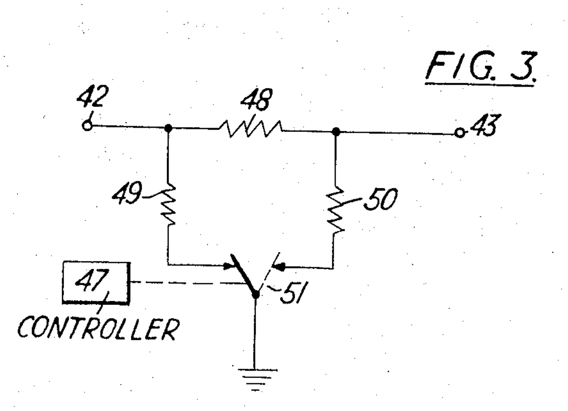

FIGS. 2 and 3 give simplified circuit diagrams of non-linear variable attenuation devices.

Referring to FIG. 1, an encoder of the invention for logarithmically quantizing and encoding a given unidirectional analogue voltage $v$ into a binary three-digit digital signal $\}e_1, e_2, e_3\{$. It comprises a reference power source 10 for generating a reference voltage E predetermined so as to be equal to the product of the sum, on one hand, of a voltage $E_0$ which is not smaller than the anticipated maximum voltage of the analogue signal $v$ plus the small correction voltage $d$ and a reciprocal, on the other hand, of the attenuation ratio $G_3'$ given by the Equation 7; an input terminal 11 for receiving the analogue signal $v$; a first fixed attenuator 12 of the attenuation ratio $G_1'$ given by the Equation 7, which is connected at its input end to the reference source 10 and which produces a fixed comparison voltage $E.G_1'$ at its output end; a first comparator 16, one of the input terminals of which is connected to the output end of the fixed attenuator 12 so as to receive the comparison voltage $E.G_1'$, the other of the input terminals of which is connected to the input terminal 11 so as to receive the analogue signal $v$ or a comparison analogue voltage $v_1$ representing the analogue signal $v$, and which produces either a finite or an infinitesimal first-series information signal $d_1$ according as the former voltage is either higher or not higher than the latter voltage; a first first-series delay circuit 18 for delaying the first-series information signal $d_1$ by a predetermined time interval T to provide a first delayed first-series information signal $d_{11}$; a second first-series delay circuit 19 for further delaying the first delayed first-series information signal $d_{11}$ by the time interval T to provide a second delayed first-series information signal $d_{12}$; an output device or a bistable circuit 101 for delivering a first-series digit code $e_1$ of "1" or "0" in accordance with whether the second delayed first-series information signal $d_{12}$ is either finite or infinitesimal; and a first output terminal 111 for delivering from the bistable circuit 101 the output pulse.

The encoder also comprises a second-series delay circuit 21 for delaying the given analogue signal $v$ by the time interval T to produce a second-series comparison analogue voltage $v_2$; a second attenuator group which consists of a second-group variable attenuator 22 connected at its input end to the reference source 10 and having an attenuation ratio $G_1$ interswitchable in the manner given by the Equation 6 between $G_1'$ and unity according as the first delayed first-series information signal $d_{11}$ is either finite or infinitesimal and a second-group fixed attenuator 23 cascaded to the variable attenuator 22 and having an attenuation ratio $G_2'$ given by the Equation 7 and which provides at its output end comparison voltages $E.G_1'.G_2'$ or $E \times 1 \times G_2'$ when the first delayed first-series information signal $d_{11}$ is finite or infinitesimal, respectively; a second comparator 26 for comparing the comparison voltage $E.G_1.G_2'$ of the attenuator group and the second-series comparison analogue voltage $v_2$ to produce either a finite or an infinitesimal second-series information signal $d_2$ in accordance with whether or not the former is larger than the latter; a first second-series delay circuit 28 for delaying the second-series information signal $d_2$ by the time interval T to provide a first delay second-series information signal $d_{21}$; a bistable circuit 102 for producing a second-series digit code $e_2$ of "1" or "0" according as the first delayed second-series information signal $d_{21}$ is either finite or infinitesimal; and a second output terminal 112 for delivering from the bistable circuit 102 the output.

The encoder further comprises a third-series delay circuit 31 for further delaying the second-series comparison analogue voltage $v_2$ by the time interval T to produce a third-series comparison analogue voltage $v_3$; a third attenuator group which consists of a third-group first variable attenuator 32 connected at its input end to the reference source 10 and having an attenuation ratio $G_1$ interswitchable in the manner given by the Equation 6 between $G_1'$ and unity according as the second delay first-series information signal $d_{12}$ is either finite or infinitesimal, a third-group second variable attenuator 33 cascaded to the first variable attenuator 32 and having an attenuation ratio $G_2$ interswitchable in the manner given by the Equation 6 between $G_2'$ and unity according as the first delay second-series information signal $d_{21}$ is either finite or infinitesimal, and a third-group fixed attenuator 34 cascaded to the second variable attenuator 33 and having an attenuation ratio $G_3'$ given by the Equation 7 and which provides at its output end a comparison voltage $E.G_1'.G_2'.G_3'$, $$E \times 1 \times G_2' \times G_3', \ E \times G_1' \times 1 \times G_3'$$

or $E \times 1 \times 1 \times G_3'$; according to the values of the second delayed first-series information signal $d_{12}$ and the first delayed second-series information signal $d_{21}$; a third comparator 36 for comparing the comparison voltage $$E.G_1.G_2.G_3'$$

of the comparator 36 and the third-series comparison analogue voltage $v_3$ to provide either a finite or an infinitesimal third-series information signal $d_3$ according to whether the former is larger than the latter or not; a bistable circuit 103 for producing a third-series digit code $e_3$ of "1" or "0" according as the third-series information signal $d_3$ is either finite or infinitesimal; and a third output terminal 113 for delivering from the bistable circuit 103 the output.

The first, the second, and the third comparators 16, 26, and 36 may each be a known circuit described by Millman and Taub in "Pulse and Digital Circuit," published by McGraw-Hill, 1956, pp. 468–480. The fixed attenuators 12, 23, and 34 and more particularly the variable attenuators 22, 32, and 33 may each be an attenuator, an example of which is shown in FIG. 2 or in FIG. 3. The attenuator shown in FIG. 2 comprises two equal resistors 40, 41 connected in series between input terminal 42 and output terminal 43, and a third resistor 44 connected to the juncture of resistors 40 and 41. A switch 45 is provided to connect resistor 44 to ground, and a short circuit closed by switch 46 is provided across resistors 40 and 41. A controller 47 responsive to signals selectively opens and closes switches 45 and 46. As the resistors form a T network a non-linear attenuation is introduced into the circuit between the input and output terminals 42 and 43 by operation of the switches.

The circuit of FIG. 2 is not entirely satisfactory if electronic switching elements are used because such elements may change with age or with temperature. Thus a change in attenuation ratio would be introduced by any change in the series switch 46. To avoid this shortcoming an attenuation network such as shown in FIG. 3 may be used. In the circuit of FIG. 3 the input and output terminals have in series between them a resistor, or other impedance 48. Two resistors 49 and 50 are connected to the line between the terminals and may be selectively connected to ground by switch 51 by action of controller 47. The switch in either position connects to ground so that regardless of the type of unit used for this purpose no impedance change occurs in the series circuit traversed by the energy between terminals 49 and 50. The resistor network is designed to provide the desired non-linear differences in impedance for the two positions of switch 51.

Inasmuch as distortions are usually introduced into the waveforms of the delayed information signals $d_{11}$, $d_{12}$, and $d_{21}$, it is preferable to warrant infallible switching of the attenuation ratios in the variable attenuators 22, 32, and 33 either by interposing additional bistable circuits 37, 38 and 39 between the first first-series delay circuit 18 and the second-group variable attenuator 22, between the second first-series delay circuit 19 and the third-group first variable attenuator 32, and between the first second-series delay circuit 28 and the third-group second variable attenuator 33, respectively. Alternatively such bistable may be incorporated in the respective comparators 16, 26, and 36. In this case, the first delayed first-series information signal $d_{11}$, for example, may be supplied from the first first-series delay circuit 18 through the associated additional bistable circuit to the second first-series delay circuit 19.

The equal time interval T of delay of the second-series delay circuit 21, the third series delay circuit 31, the first first-series delay circuit 18, and the like are so determined in consideration of the time required for operation of the first, the second, and the third comparators 16, 26, and 36 as well as the associated additional bistable circuits, if any, that the comparison voltage $E.G_1.G_2.G_3'$, for example, provided by the third attenuator group under control of the second delayed first-series information signal $d_{12}$ and the first delayed second-series information signal $d_{21}$ may be supplied to the third comparator 36 substantially simultaneously with the third-series comparison analogue voltage $v_3$. In some cases, it may be preferable that comparison currents or, in general, comparison powers are provided in place of the comparison voltages produced by the attenuator groups. Although attenuators are excellent in stability, amplifiers may also be used instead to provide such comparison powers.

The analogue signal $v$ supplied to the input terminal 11 may be a single pulse analogue signal or sampled successive analogue pulse signals. It is also possible to supply the input terminal 11 with a continuous analogue signal $v$ and to make the comparators 16, 26, and 36 perform simultaneous sampling and comparison. On encoding eventually pulse amplitude modulated (PAM) analogue signals as is the case with most of the encoders, the predetermined time interval T is usually made equal to the sampling period, although the time interval T may be shortened down to a limit allowed by the operation time of the attenuator groups and comparators and the additional bistable circuits, if any, or may be optionally lengthened. Thus, the encoder can perform high-speed encoding.

Now the operation of the encoder of the invention will be explained with particular reference to a case wherein the analogue signal $v$ is smaller than a power $E.G_1'.G_3'$ and greater than another power $E.G_1'.G_2'$. It is assumed here that the second-series and the third-series delay circuits 21 and 31 are ideal delay circuits which do not attenuate at all the respective input signals. Inasmuch as the comparison power $E.G_1'$ of the first attenuator group which is greater than the power $E.G_1'.G_3'$, is greater than the first-series comparison analogue signal $v_1$, the first-series information signal $d_1$ is finite and the code $e_1$ of the most significant digit becomes "1." Thus, the attenuation ratio is set at $G_1'$ in the variable attenuator 22 of the second attenuator group. Inasmuch as the power $E.G_1'.G_2'$ of the second attenuator group is smaller than the second-series comparison analogue signal $v_2$, the second-series information signal $d_2$ becomes infinitesimal to turn the code $e_2$ of the second digit to "0." Now that the second delayed first-series information signal $d_{12}$ is finite and the first delayed second-series information signal $d_{21}$ is infinitesimal, the attenuation ratios of the first and the second variable attenuators 32 and 33 of the third attenuator group becomes $G_1'$ and 1, respectively. Thus, the comparison power $E \times G_1' \times 1 \times G_3'$ of the third attenuator group turns larger than the third-series comparison analogue signal $v_3$, with the result that the third-series information signal $d_3$ becomes finite to give "1" for the lowest-digit code $e_3$. Thus, the given analogue signal $v$ is encoded into a digital signal "101."

If the given analogue signal $v$ is greater than a power $E.G_3'$, a digital signal "000" is obtained. If smaller than $E.G_3'$ and greater than $E.G_2'$, a digital signal "001" follows. If smaller than $E.G_2'$ and greater than $E.G_2'.G_3'$, a digital signal "010" follows. If smaller than $E.G_2'.G_3'$ and larger than $E.G_1'$, a digital signal "011" results. If smaller than $E.G_1'$ and larger than $E.G_1'.G_3'$, a digital signal "100" comes out. If now smaller than $$E.G_1'.G_2'.G_3'$$

a digital signal "111" is the result.

In the above embodiment, the given analogue signals were unipolar. If bipolary analogue signals such as voice signals are to be handled, the reference voltage E of the reference power source 10 is adapted to be switched to positive and negative according to the sign of the given analogue signal as discriminated by a sign discrimination circuit (not shown), such as a Schmidt circuit or the like, interposed after the input terminal 11. Although the analogue signal $v$ was encoded into a three-digital signal in the above embodiment, it is easy to increase the number of digits. While the analogue signal $v$ was encoded in the above embodiment into a binary code digital signal, it is also possible to provide an encoder for an $m$-nary code digital signal.

Thus, an encoder of the invention with non-linear quantization comprises (1) a reference power source 10 for generating a predetermined reference power E; (2) a plurality of attenuator groups, each containing one or more attenuators 12 or 22 and 23 or 32, 33, and 34 connected at the input end to the reference power source 10 and cascaded so as to produce at the output end a comparison power $E \cdot G_1'$ or $E \cdot G_1 \cdot G_2'$ or $E \cdot G_1 \cdot G_2 \cdot G_3'$; (3) an input terminal 11 for receiving an analogue signal $v$ to be encoded; (4) first means 11 (by itself), 21, and 31 connected to the input terminal 11 and adapted to provide from the analogue signal $v$ a plurality of comparison analogue signals $v_1$, $v_2$, and $v_3$ appearing in succession at predetermined first time positions; (5) a plurality of comparators 16, 26 and 36 connected at ones of their input ends to the output ends of the attenuator groups, respectively, and at the others of their input ends to the first means 11, 21, and 31 so as to receive therefrom the comparison analopue signals $v_1$, $v_2$, and $v_3$, respectively, and adapted to compare the comparison powers $E \cdot G_1'$, $E \cdot G_1 \cdot G_2'$, and $E \cdot G_1 \cdot G_2 \cdot G_3'$ and the comparison analogue signals $v_1$, $v_2$, and $v_3$ to produce at their output ends and substantially at the first time positions information signals $d_1$, $d_2$, and $d_3$ representing the results of comparisons, respectively; (6) a plurality of output devices 101, 102, and 103; (7) second means 18, 19, and 28 for (A) supplying the output devices 101, 102, and 103 with the information signals $d_1$, $d_2$, and $d_3$, respectively, so that the output devices may simultaneously produce digit signals $e_1$, $e_2$, and $e_3$ representing the results of encoding, respectively, and (3) producing by delaying the information signals $d_1$, $d_2$, and $d_3$ one or more delayed information signals groups ($d_{11}$) and ($d_{12}$ and $d_{21}$), each consisting of one or more delayed information signals $d_{11}$ or $d_{12}$ and $d_{21}$, at second time positions which are substantially coincident with the first time positions except the first one; and (8) third means for so controlling by the delayed information signal groups ($d_{11}$) and ($d_{12}$ and $d_{21}$) the comparison powers supplied the comparators 26 and 36 at those respective ones of the first time positions which are substantially coincident with the second time positions, and that the comparison powers may be given by a predetermined non-linear law and the delayed information signal groups, respectively. In this manner an encoder of the invention is so constructed that comparisons performed at the first, the second, and the third comparators 16, 26, and 36 may be delayed from one another by the time interval T, while the result of comparison at the first comparator 16 is fed forward as the delayed information signal $d_{11}$ for determining the comparison power to be used at the second comparator 26 and while the results of comparisons at the first and the second comparators 16 and 26 are fed forward as the delayed information signals $d_{12}$ and $d_{21}$, respectively, for determining the comparison power to be used at the third comparator 36. The attenuation ratio $G_1'$ of the fixed attenuator 12 constituting the first attenuator group, the respective attenuation ratios $G_1$ and $G_2'$ of the variable and the fixed attenuators 22 and 23 constituting the second attenuator group, and the attenuation ratios $G_1$, $G_2$, and $G_3'$ of the first and the second variable and the fixed attenuators 32, 33, and 34 constituting the third attenuator group may be determined according to any non-linear law other than given by the Equations 6 and 7. Particularly, determination in consideration of the unavoidable change of the analogue signal $v$ during successive formation of the comparison analogue signals $v_1$, $v_2$, and $v_3$ makes the precision of encoding higher. Incidentally, it is very advantageous in increasing the precision in this sense in logarithmic encoding, to provide for each attenuator group an individual reference power source designed with the consideration mentioned in my copending patent application Ser. No. 304,798.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. An encoder comprising a reference power source, a signal input terminal, a first comparator for comparing energy from said reference power source and an input signal from said terminal to provide a first output signal, a delay circuit for the first output signal, a variable amplitude changing circuit coupled to said reference power source, means for applying said delayed first output signal from said delay device to adjust the amplitude change under control of said output signal, a second comparator, means for applying the reference voltage output from said attenuator, and the signal from said terminal in coincident time relation to said second comparator to provide a second output signal, and means for producing code pulses responsive to said first delayed output pulse, and said second output pulse.

2. An encoding device comprising (1) an input terminal for receiving an analogue signal be encoded;

(2) first means connected to said input terminal and adapted to successively produce a plurality of comparison analogue signals by delaying said analogue signals by from zero to a specific number of predetermined time intervals;

(3) a reference power source for producing a predetermined reference power;

(4) a plurality of groups of amplitude changers connected at their input ends to said reference power source and adapted to produce at their output ends comparison powers satisfying a preselected law, one of said groups, including at least one amplitude changer, and the remaining groups having at least two amplitude changes in tandem.

(5) a plurality of comparators each having one input connected to said output end of a corresponding attenuator group and a second input connected to said first means and being adapted to produce information signals representing the results of comparison between said comparison powers and said comparison analogue signals;

(6) second means for providing delayed information signal sequences from said information signals, each of said sequences including at least one delayed information signal formed by way of delaying the information signals by from zero to a specific number of said predetermined time intervals;

(7) third means for controlling said reference power by varying attenuation ratios of said attenuators in response to said delayed information signals; and (8) a plurality of output devices for producing in response to said delayed information signals digit signal codes representing the results of encoding, respectively.

3. An encoder comprising a reference power source, first, second and third comparators, a signal input terminal connected to each said comparator, coupling means for coupling said reference power source to each of said comparators over fixed amplitude changers, a first input delay circuit in the connection between said signal input terminal and said second comparator and a second input delay circuit in tandem with said first delay circuit in the connection between the signal input terminal and said third comparator, first, second and third output circuits for said first, second and third comparators, first and second delay means in tandem between said first comparator and said first output circuit, a third delay means between said second comparator and said second output circuit, a first variable amplitude changer in the coupling between said source and said second comparator, means for controlling said first variable amplitude change rin response to signal output from said first comparator after passing said first delay means, second and third variable amplitude changes in tandem in the coupling between said reference source and said third comparator, means for controlling said second variable amplitude changer in response to signal output from said first comparator after passing said second delay means, and means for controlling said third variable amplitude changer by signal output from said second comparator after passing said third delay means.

References Cited by the Examiner

UNITED STATES PATENTS

| | | | |
|---|---|---|---|
| 3,100,298 | 8/1963 | Fluhr | 340—347 |
| 3,156,913 | 11/1964 | Crocker et al. | 340—347 |

MAYNARD R. WILBUR, *Primary Examiner.*

D. W. COOK, *Examiner.*

A. L. NEWMAN, *Assistant Examiner.*